United States Patent
Baser et al.

(10) Patent No.: US 12,090,007 B2
(45) Date of Patent: Sep. 17, 2024

(54) CAPPED, GUIDED DENTAL IMPLANT SHIELD

(71) Applicant: ISTANBUL ÜNIVERSITESI REKTÖRLÜGÜ, Istanbul (TR)

(72) Inventors: Ülkü Baser, Istanbul (TR); Serhan Okutan, Istanbul (TR)

(73) Assignee: İstanbul Üniversitesi Rektörlüğü, Istanbul (TR)

( * ) Notice: Subject to any disclaimer, the term of this patent is extended or adjusted under 35 U.S.C. 154(b) by 29 days.

(21) Appl. No.: 17/422,956

(22) PCT Filed: Jul. 21, 2020

(86) PCT No.: PCT/TR2020/050637
§ 371 (c)(1),
(2) Date: Jul. 14, 2021

(87) PCT Pub. No.: WO2021/201794
PCT Pub. Date: Oct. 7, 2021

(65) Prior Publication Data
US 2022/0323176 A1    Oct. 13, 2022

(30) Foreign Application Priority Data

Mar. 31, 2020 (TR) ................................. 2020-05031

(51) Int. Cl.
*A61C 1/08* (2006.01)
*A61C 8/00* (2006.01)

(52) U.S. Cl.
CPC ............ *A61C 1/084* (2013.01); *A61C 8/0087* (2013.01); *A61C 8/0089* (2013.01)

(58) Field of Classification Search
CPC ........... A61C 1/08; A61C 1/082; A61C 1/084; A61C 8/00; A61C 8/0087; A61C 8/0089
USPC ............................................ 433/72, 75, 173
See application file for complete search history.

(56) References Cited

U.S. PATENT DOCUMENTS

| 4,321,039 A | 3/1982 | Schuss |
| 5,439,381 A | 8/1995 | Cohen |
| 7,396,232 B2 * | 7/2008 | Fromovich .......... A61C 8/0087 |
| | | 606/105 |

(Continued)

FOREIGN PATENT DOCUMENTS

| DE | 102011112507 A1 * | 3/2013 | ............. A61C 1/084 |
| DE | 202013008057 U1 * | 11/2013 | ........... A61C 8/0087 |

(Continued)

OTHER PUBLICATIONS

International Search Report and Written Opinion of the International Searching Authority for corresponding PCT/TR2020/050637, dated Dec. 22, 2020.

*Primary Examiner* — Jacqueline T Johanas
*Assistant Examiner* — Leah Badger
(74) *Attorney, Agent, or Firm* — Rahman LLC

(57) ABSTRACT

A guided dental implant shield having an implant connector piece where the implant is positioned and an inner shield where the implant connector piece is placed in such a way to grasp the implant, an outer shield with monolithic structure which moves by sliding on the inner shield and guides it at an angle inside the cavity opening to the jawbone, and which has an angled part at its lower end, and a cap which is positioned under the outer shield in such a way to isolate the implant inside the shields.

5 Claims, 3 Drawing Sheets

(56) References Cited

U.S. PATENT DOCUMENTS

2011/0034931 A1* 2/2011 Sawatari ............... A61F 2/2803
606/80
2011/0275032 A1 11/2011 Tardieu et al.

FOREIGN PATENT DOCUMENTS

| EP | 1894539 A1 | 3/2008 |
| WO | 2010125593 A1 | 11/2010 |
| WO | 2018071863 A1 | 4/2018 |

* cited by examiner

CAPPED, GUIDED DENTAL IMPLANT SHIELD

TECHNICAL FIELD

The invention relates to the 'capped, guided dental implant shield' designed to reduce the risk of failure of dental implants, which are widely preferred in treatment of missing teeth, shorten the treatment process, and provide more precise application with affordable cost.

In particular, the invention relates to a capped, guided implant shield that provides precise positioning for the placement of the dental implant in the jawbone without contact with surrounding tissues or causing contamination.

The invention relates to providing precise positioning during placement on the jawbone with complete isolation from the sterilization starting from the moment of production to the moment of application of the implant. In addition to this, our invention provides the multi-purpose shield function, which allows both preserving the liquid for implants maintained in special liquids, and guided placement by removing the cap.

STATE OF THE ART

Dental implants are artificial tooth roots inserted into the jawbone to replace missing teeth, in order to provide function as a substitute for missing teeth as a result of causes such as gum diseases, trauma, irreparable caries and to complete the aesthetic look. Dental implants are often made of materials such as titanium, zircon etc. due to their high adaptability to tissues of the human body. Placement of dental implants is a surgical procedure and carries the normal risks of surgery including infection. Therefore, it is critical to keep implant clean during the surgical procedure, by preventing contact with adjacent tissues such as teeth, tongue, cheeks, gums and saliva to prevent infection. Dental implants are the preferred treatment both for physicians and patients today.

Implant applications are performed in almost every dental office. However, there are some limitations and reasons for failure in implant applications as stated below.

In patients with anatomical limitations and insufficient bone presence, placement of the implant at the desired angle to the jawbone is difficult for the physician. This situation can be overcome with customized implant guides, but these guides bring substantially high costs and extra labor. Setting this angle by estimation without using a specific guide may cause technical problems in later processes.

For an implant to become permanently stable, the body must grow bone to the surface of the implant (osseointegration). Based on this biologic process, three to six months of integrating time (depending on various factors) was allowed before placing the teeth on implants (restoring them). When the implant is integrated to the jawbone, prosthesis over implants are applied in order to meet the chewing needs of the patients and for aesthetic needs. This process brings loss of time, and higher costs for the patient and the physician. Dental implants, which are stored in fluids due to their special surface characteristics can be used to shorten this healing process. However, if these implants are used, an extra storage mechanism where the implant is maintained is required. The use of different mechanisms during the stages starting from the production of the implant to its placement in the bone adversely affects the application in terms of time, costs and risks. The implant is brought to the sterile surgical environment with the liquid storage chamber. When the implant is applied, it is removed from the chamber and taken into the mouth without any protection or isolation and from there placed on the bone. Another option is to insert the implant with pre-prepared, personalized guides after removing the implant from the chamber. This creates difficulties in terms of time and cost. But it is less risky in terms of the success of the application and ensuring precise positioning.

The sliding motion of the two or more cylinders over each other, which are designed to place the implant by rotating it inside the bone, will be less controlled since there is no friction between them.

One of the main reasons for failure in implant applications is the inability of the implant to hold onto the bone due to an early infection. In cases where the healing capacity of the bone tissue to which the implant is placed is restricted for various reasons such as diabetes, radiotherapy, or other immune compromising diseases reducing the failure rate requires extra precautions.

Dental implant applications should be performed in a sterile environment. During the placement of the implant to the jawbone, it is important that the implant should not come in contact with bacteria, i.e. the complete isolation of the implant from the environment. The most certain way to overcome this problem is to prevent any contact during the time from unpacking the implant to the placement into the bone.

Therefore, due to the shortcomings described above and due to the lack of existing solutions on the subject, a development in the relevant technical area is required.

BRIEF DESCRIPTION OF THE INVENTION

The present invention relates to a capped, guided implant shield that meets the requirements mentioned above, while eliminating all disadvantages and providing some additional advantages.

The primary purpose of the invention is to establish a guided implant shield that allows the implant to be positioned at the desired angle without any preparation or additional item tool or part requirement if there is not enough bone in the patient or if it is not possible to place the implant straight due to adjacent anatomical formations.

A purpose of the invention is to establish a guided implant shield that minimizes the difficulties that the physician will experience during the operation and reduces the risk of contamination.

Another purpose of the invention is to provide a disposable guided implant shield that is adapted to the implant during the production phase of the implant.

Another purpose of the invention is to provide a guided implant shield that is easy to implement and low cost.

Another purpose of the invention is to provide a capped, guided implant shield that allows the implants stored in special fluids to be adapted to the jawbone without requiring an extra storage mechanism.

Another purpose of the invention is to reveal a guided implant shield that minimizes the possible operation risks and shortens recovery time.

In order to accomplish the aforementioned purposes, the invention relates to a guided implant shield comprising an implant connector piece and an inner shield where the mentioned implant connector piece is placed in such a way that to grasp the implant. Accordingly, the guided implant shield in question comprises an outer shield with monolithic structure which move by sliding on the mentioned inner shield and guides it at an angle inside the cavity opening to the jawbone and which comprises an angled section at its the lower end, and a cap which is positioned under the mentioned outer shield in such a way to isolate the implant inside the shields.

In order to accomplish the purposes of the invention, if there is no need for angled placement, the mentioned outer shield comprises a breaking line in order to allow the mentioned angled section to be separated from the outer shield.

In order to accomplish the purposes of the invention, the mentioned angled section comprises a rubber seal in order to support the motion between the mentioned inner shield and the outer shield.

In order to accomplish the purposes of the invention, the guided implant shield comprises a cap and a handle introduced on the cap.

In order to accomplish the purposes of the invention, the mentioned angled section is configured at different angles depending on the angle of the outer shield with respect to the jawbone.

The structural and characteristic features and all advantages of the invention will be understood more clearly through the detailed explanation written with the following figures and references to these figures, and therefore assessment should be made by considering these figures and detailed explanation.

BRIEF DESCRIPTION OF DRAWINGS

Drawings do not necessarily have to be scaled, and details that are not necessary to understand the current invention may have been omitted. Furthermore, elements that are at least largely identical, or at least have largely identical functions, are denoted by the same number.

DESCRIPTION OF REFERENCES

10 Guided Implant Shield
  11 Outer Shield
    111 Angled Section
    112 Breaking Line
  12 Inner Shield
    121 Seal
  13 Implant Connector Piece
  14 Cap
    141 Handle

DETAILED DESCRIPTION OF THE INVENTION

In the herein detailed description, the capped, guided implant shield (10) of the invention is described only for a better understanding of the subject matter, without posing any limitations.

Figure 1:
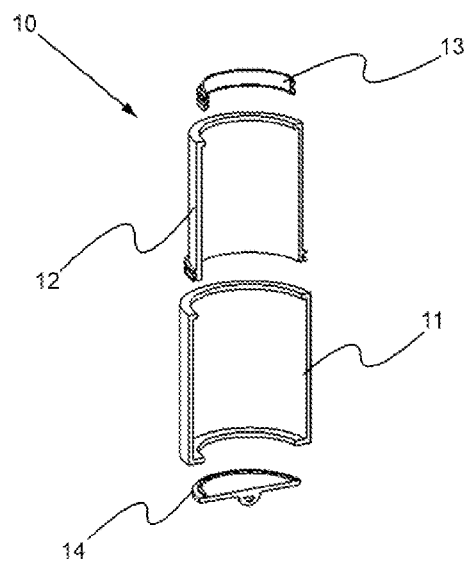
FIG. 1 is an exploded cross-section view of the guided implant shield of the invention.
Figure 2:
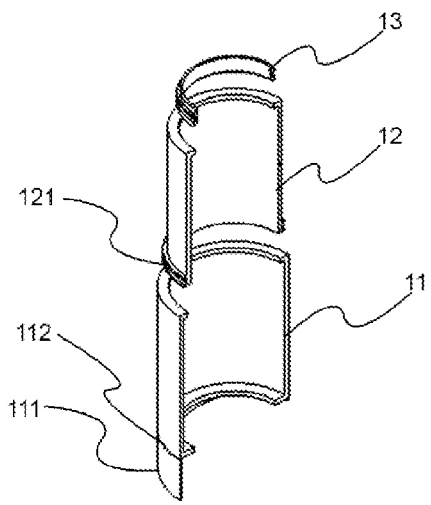
FIG. 2 is another exploded cross-section view of the guided implant shield of the invention.
Figure 4:
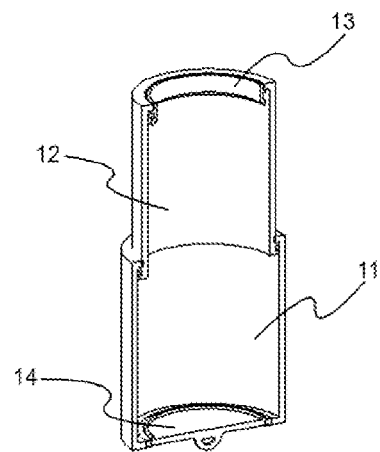
FIG. 4 is an assembled cross-section view of the guided implant shield of the invention.

The guided implant shield (10) is essentially used to place the implant in the cavity opened in the jawbone without contamination and at the desired angle. With reference to FIG. 1 and FIG. 2, the guided implant shield (10), cross-section views of which are shown, essentially comprises an outer shield (11); an inner shield (12) on which the mentioned outer shield (11) moves by sliding; an implant connector piece (13) where the implant is placed, having a design based on the implant to be used and a cap (14) introduced below the outer shield (11) in order to limit the guided implant shield (10) (FIG. 4).

Figure 3:
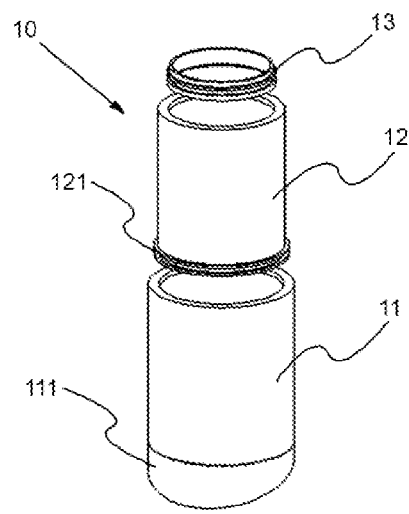
FIG. 3 is a general exploded view of the guided implant shield of the invention.
Figure 5:
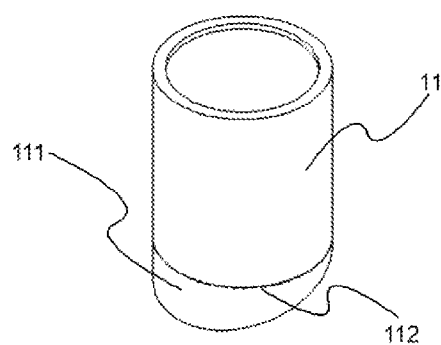
FIG. 5 is an overview of the outer shield of the guided implant shield of the invention.

As can be seen in FIG. 3 and FIG. 5, there is an angled section (111) which provides a guiding feature at the lower end of the outer shield (11) monolithically with an angle with respect to the outer shield (11). The said angled section (111) allows the outer shield (11) to be placed at the desired angle into the jawbone during the procedure of guiding the implant. The angled section (111) can be configured in different degrees according to the angle of the outer shield (11) with respect to the jawbone. Thereby, in cases where the implant cannot be placed on a straight axis to the jawbone or adjacent anatomical formations, a healthy performance of the implantation process is ensured, eliminating additional costs and labor. The angled section (111) can be separated from the outer shield (11) by a point breaking line (112) configured on the outer shield (11). In cases where the angled placement of the implant is not necessary, the outer shield (11) is used by breaking the angled section (111) is separated by breaking through the break line (112).

The seal (121) is provided on the inner shield (12). The mentioned seal (121) allows the outer shield (11) to move gradually over the inner shield (12) as the implant settles into the bone. The implant connector piece (13) where the implant is placed is also grasped by the inner shield (12). The implant connector piece (13) allows the implant to be inserted into the jawbone with an implant wrench, while at the same time maintaining the relationship between the inner shield (12) and the outer shield (11) with the implant.

Figure 6:
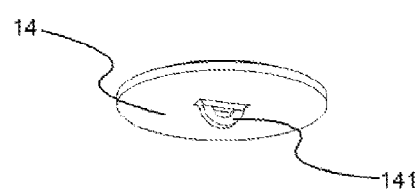
FIG. 6 is a general exploded view of the guided implant shield cap of the invention.

The aforementioned cap (14), which is shown in FIG. 6, ensures that the implant adapted to the implant attachment (13) is isolated within the inner shield (12) and outer shield (11). The cap (14) is important for treatments where specific implants are used with special hydrophilic fluids to reduce the duration required for the implants to hold on to the bone. By using a cap (14), it is possible to prevent the fluid on the implant from losing its effectiveness by contacting the surfaces without requiring an extra storage mechanism. A handle (141) is introduced on the cap (14). Before the implant is placed in the jawbone, the cap (14) is removed from the outer shield (11) by holding it from aforementioned handle (141) with a dental probe. Thus, the implant is positioned on the jawbone with minimal contact, protecting the specially designed surface.

In the placement of the implant to the bone with the guided implant shield (10), first the implant connector piece (13) is positioned on the implant. The dental implant is placed in the cavity on the jawbone by rotating it with the help of an implant wrench. At this stage, the outer shield (11), the inner shield (12) and the implant connector piece (13) slide over each other and close and assemble on the implant connector piece (13). Thereby, during the placement of the implant to the jawbone, the desired angled orientation can be carried out by cutting the contact of the implant with the outside environment by means of the inner shield (12) and the outer shield (11).

In a preferred embodiment of the invention, the number of shields that prevent the contact of the implant with the outside environment is configured to be 2. When necessary, the number of nested shields can be changed. In a preferred embodiment of the invention, the outer shield (11) and the inner shield (12) are preferably made of transparent acrylic material. This allows the physician to see and position the dental implant comfortably during the operation. In addition, the guided implant shield (10), made of acrylic material, is low cost and can be attached to the implant during the sterile packaging of each implant and used as a disposable.

The invention claimed is:

1. A guided implant shield intended to be used for placing an implant to a jawbone, comprising:
   an implant connector piece where the implant is positioned; and
   an inner shield where the implant connector piece is placed in such a way to grasp the implant;
   an outer shield with a monolithic structure which moves by sliding on the inner shield and guides the implant at an angle inside a cavity opening to the jawbone and which comprises an angled section at a lower end of the outer shield, wherein the outer shield comprises a breaking line to allow the angled section to separate from the outer shield; and
   a cap which is positioned under the outer shield in such a way to isolate the implant inside the inner shield and the outer shield.

2. The guided implant shield according to claim 1, comprising a seal to support motion between the inner shield and the outer shield.

3. The guided implant shield according to claim 1, comprising a handle configured on the cap.

4. The guided implant shield according to claim 1, wherein the angled section is configured at different angles based on the angle of the outer shield with respect to the jawbone.

5. The guided implant shield according to claim 1, wherein the implant connector piece is to allow the implant to be inserted into the jawbone, while at the same time maintaining a relationship between the inner shield and the outer shield with the implant.

\* \* \* \* \*